(12) United States Patent
Smith et al.

(10) Patent No.: US 7,430,223 B2
(45) Date of Patent: Sep. 30, 2008

(54) WIRELESS INTERFACE

(75) Inventors: David W. Smith, Cedar Park, TX (US); Garth Hillman, Austin, TX (US); Clark L. Buxton, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1129 days.

(21) Appl. No.: 10/231,764

(22) Filed: Aug. 28, 2002

(65) Prior Publication Data

US 2004/0042482 A1 Mar. 4, 2004

(51) Int. Cl.
*H04J 3/04* (2006.01)
(52) U.S. Cl. .................................. 370/535; 370/463
(58) Field of Classification Search ..................... None
See application file for complete search history.

(56) References Cited

U.S. PATENT DOCUMENTS

| | | | | |
|---|---|---|---|---|
| 5,889,602 | A * | 3/1999 | Johnson et al. | 398/131 |
| 5,949,565 | A | 9/1999 | Ishida | 359/154 |
| 6,028,649 | A * | 2/2000 | Faris et al. | 349/10 |
| 6,031,716 | A * | 2/2000 | Cipolla et al. | 361/687 |
| 6,047,301 | A | 4/2000 | Bjorklund et al. | 708/139 |
| 6,175,492 | B1 * | 1/2001 | Nobuchi | 361/687 |
| 6,189,056 | B1 * | 2/2001 | Ogura et al. | 710/62 |
| 6,243,261 | B1 * | 6/2001 | Janik et al. | 361/687 |
| 6,845,005 | B2 * | 1/2005 | Shimano et al. | 361/683 |
| 6,952,571 | B1 * | 10/2005 | Garrabrant et al. | 455/226.2 |
| 2001/0055196 | A1 * | 12/2001 | Anzai et al. | 361/681 |
| 2003/0027517 | A1 * | 2/2003 | Callway et al. | 455/3.01 |
| 2003/0198008 | A1 * | 10/2003 | Leapman et al. | 361/681 |

FOREIGN PATENT DOCUMENTS

| | | |
|---|---|---|
| DE | 196 42 267 A1 | 5/1998 |
| EP | 1 355 221 A2 | 10/2003 |
| JP | 08046385 | 2/1996 |

OTHER PUBLICATIONS

Miyake, Kuriko. "Panasonic unveils PC with wireless display," via Internet at http://www.itworld.com/Comp/1290/IDG010626panasonic/pfindex.html, pp. 1-2.

* cited by examiner

*Primary Examiner*—Firmin Backer
*Assistant Examiner*—Toan D Nguyen
(74) *Attorney, Agent, or Firm*—Winstead, P.C.

(57) ABSTRACT

A computing device has a plurality of subsystems located in subsections that are moveable with respect to each other. Communication between the subsections is accomplished with wireless transceivers transmitting over the air gap interface separating the subsections. Data from multiple communicating subsystems in the subsections is multiplexed into a single data stream and encoded into the communication protocol of the wireless transceivers. The encoded data stream is transmitted to a compatible transceiver where it is decoded. The decoded data stream is demultiplexed into individual data streams for each of the communicating subsystems. The wireless transceivers include multiple communication protocols and transmission frequencies from radio frequencies to optical frequencies. Optical fibers, transmission lines or waveguides may be used to transmit signals within each subsection depending on the wireless technology and protocol.

22 Claims, 6 Drawing Sheets

WIRELESS INTERFACE

TECHNICAL FIELD

The present invention relates in general to wireless communication and in particular to wireless communication between sub-assemblies in portable, laptop and handheld computers.

BACKGROUND INFORMATION

Portable computers (e.g., laptop, handheld and subcompacts) achieve their small overall size and volume by folding their largest component, their display screen and supporting lid subassembly, when not in use. Unfortunately, hinging the display subsection makes it difficult to communicate with or power devices in the lid portion. This occurs because the wires used to connect devices in the lid with devices in the base must often snake within the hinge itself and are exposed to constant bending and unbending. Further, connections to devices in the lid (e.g., LCD graphic displays, USB cameras and other devices) may require many signal wires which must be compressed into a tiny area of the hinge width. Compressing these wires into a small area requires small signal trace sizes which in turn creates problems of signal cross-talk between traces and other types of interference.

The problem is exacerbated when wireless local area network (WLAN) and wireless wide area network (WWAN) connectivity is added to these types of portable computers. WLAN and WWAN employ radio technologies and each require the inclusion of specialized antennas that work best when positioned in the highest location possible within a unit, usually the lid area of the portable computer. The interconnects required between the motherboard of the portable computer and a WLAN and/or WWAN radio subsystem located in its lid further complicate the hinge wiring problem by adding more signals with higher data rates. In addition, marketing requirements may dictate that all parts of a portable computer system be as thin as possible. Therefore, the wiring system elements (e.g., flexible circuits, connectors, shielding and wires) may ultimately limit the marketability of a particular portable computer by limiting the thickness of the lid or in some cases even the main case itself. Even if the hinge wiring harness is enlarged to include WLAN or WWAN (or both) radio interface signals, the signals may interfere or be interfered with by the other signals such as for the LCD display.

Finally, the cost of the wiring system elements for the various subsystems in a portable computer is non-trivial. It has been found that only specialized flexible circuit substrates are able to carry the required number of signal lines with the flexibility and durability needed in the demanding environment of the hinge area. Such wiring subassemblies are costly to build and to assemble within the body of the computer case itself. Further, wiring subsystems subject to movement (folding, sliding, etc.) are a major contributor to original equipment manufacturer (OEM) customer service costs due to increased calls and product returns. To enable modern portable computer systems to continue to add desired technologies and to retain their marketable physical size and weight, there is a need for a way to reduce the wiring required for communicating signals between devices in the main body and devices in the lid of portable computer systems.

SUMMARY OF THE INVENTION

A solution to the problem of low-cost portable computer interconnection resides with electromagnetic communications technology: using radio, magnetic, or optical methods to wirelessly communicate between moveable sections that are mechanically connected. The present invention uses wireless technology to communicate between subsystems in the case and the lid of a portable computer. A variety of electromagnetic communications may be used to span a short air gap distance between these moveable sections. The lid and base are hingedly coupled so that they may be moved relative to each other. The data for one or more subsystems in the lid are multiplexed into a single data stream which is then encoded into the protocol for a base transceiver. The data is wirelessly transmitted across an air gap separating the base transceiver and a lid transceiver. The received data is decoded and demultiplexed and then coupled to subsystems in the lid section. Likewise, data for one or more subsystems in the base are multiplexed into a single data stream and encoded into the protocol for the lid transceiver. Data may be transmitted bi-directionally on a single link or transmitted on multiple wireless links. The wireless links may employ a variety of protocols and electromagnetic spectra in communicating across the air gap separating the lid and base sections.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

In general, the present invention utilizes an air gap interface to couple needed signals between subsystems in the lid and the motherboard in the base. The air gap interface comprises the area where the lid and the base move relative to each other. Since the lid may have multiple subsystems with different communication protocols, it is desirable to consolidate the multiple data paths into a single or at most a dual communication path, though more communications paths are within the scope of the present invention. This allows the physical interface to be likewise consolidated.

Figure 1:
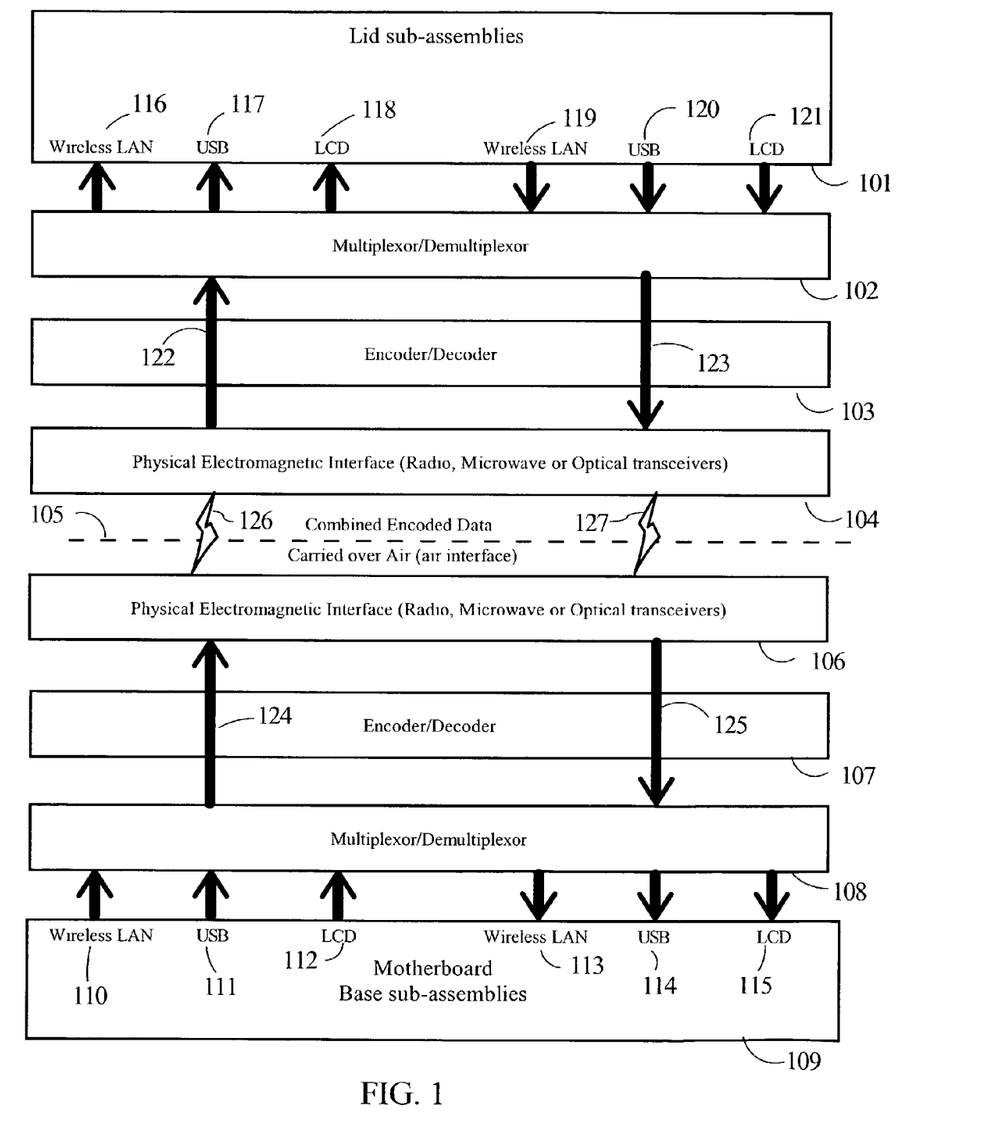
FIG. 1 is a block diagram illustrating processing of signals which are transmitted from a subsystem in a first section to a subsystem in a second section according to embodiments of the present invention.

FIG. 1 is a block diagram illustrating the consolidation of communication paths and the elements needed to allow an air gap interface as the main communication link. Exemplary lid 101 comprises a wireless local area network (WLAN), a universal serial port (USB) device and a liquid crystal display (LCD). The actual devices are not shown in FIG. 1, rather their input/outputs (I/O) are identified. WLAN 116 inputs signals for the WLAN. Likewise, WLAN 119 outputs signals for the WLAN. The USB communicates using input USB 117 and output USB 120. The LCD subsystem used to display information communicates using input LCD 118 and output LCD 121. Multiplexor (MUX)/demultiplexor (DMUX) 102 is used to consolidate multiple communication paths (e.g., WLAN 119, USB 120 and LCD 121) into a single path (e.g., 123). In the same manner, consolidated data (CD) in path 122 is de-multiplexed into WLAN 116, USB 117, and LCD 118. CD 122 is decoded and CD 123 is encoded. Data for the lid subassemblies are received in CD 122 and decoded by Encoder/Decoder 103. CD 123 is encoded compatible with the particular communication protocol used in the physical electromagnetic interface (PEI) 104.

A communication protocol refers to hardware and software standards that govern data transmission between devices. The term "protocol" is very generic and is used for hundreds of different communication methods. A protocol may define the packet structure of the data transmitted or the control commands that manage the session or both. In this disclosure, protocol also includes the modulation/demodulation scheme necessary to encode and decode data relative to the electromagnetic waves associated with a particular wireless interface.

CD 123 is transmitted over air gap interface 105 and is received in PEI 106. Encoder/Decoder 107 decodes CD 123 into CD 125. CD 125 is demultiplexed in MUX/DMUX 108 to produce individual data streams WLAN 113, USB 114 and LCD 115 which are received in appropriate circuits in main logic board 109. In the same manner, signals WLAN 110, USB 111, and LCD 112 are multiplexed in MUX/DMUX 108 and coupled to Encoder/Decoder 107 to produce CD 124 which is coupled to PEI 104 which transmits the data to Encoder/Decoder 103 over air gap interface 105. CD 122 is demultiplexed in MUX/DMUX 102 producing individual signals WLAN 116, USB 117 and LCD 118. PEI 104 and 106 are compatible transceiver systems and may operate over wide range of electromagnetic frequency spectra and use one of many possible modulation schemes.

The particular communication system, PEI 104 and PEI 106, would obviously need to be compatible with the devices within a particular system and not cause undue interference or be susceptible to interference from standard devices within a portable computer. It is understood that the system of FIG. 1 may be used between any two locations in a computer which may be connected using wired technologies and still be within the scope of the present invention.

One embodiment of the present invention utilizes light to communicate to the lid. In this embodiment, light may be coupled to air gap interface using a flexible light pipe such as a fiber optics. Light may also be used to directly communicate through the air gap interface in a broadcast mode. Much like light from a light bulb will fill a room, modulated light from an optical source may be used to flood an area around the portable computer employing embodiments of the present invention. Fiber optics may be the best solution since optical fibers have a large bandwidth and are manufactured in high volume. Fiber optics offers great flexibility in coupling modulated light from a point of generation or reception to or from the air gap interface area, however, placing a modulated light source and receiver in the air gap interface area is also within the scope of the present invention.

Figure 2:
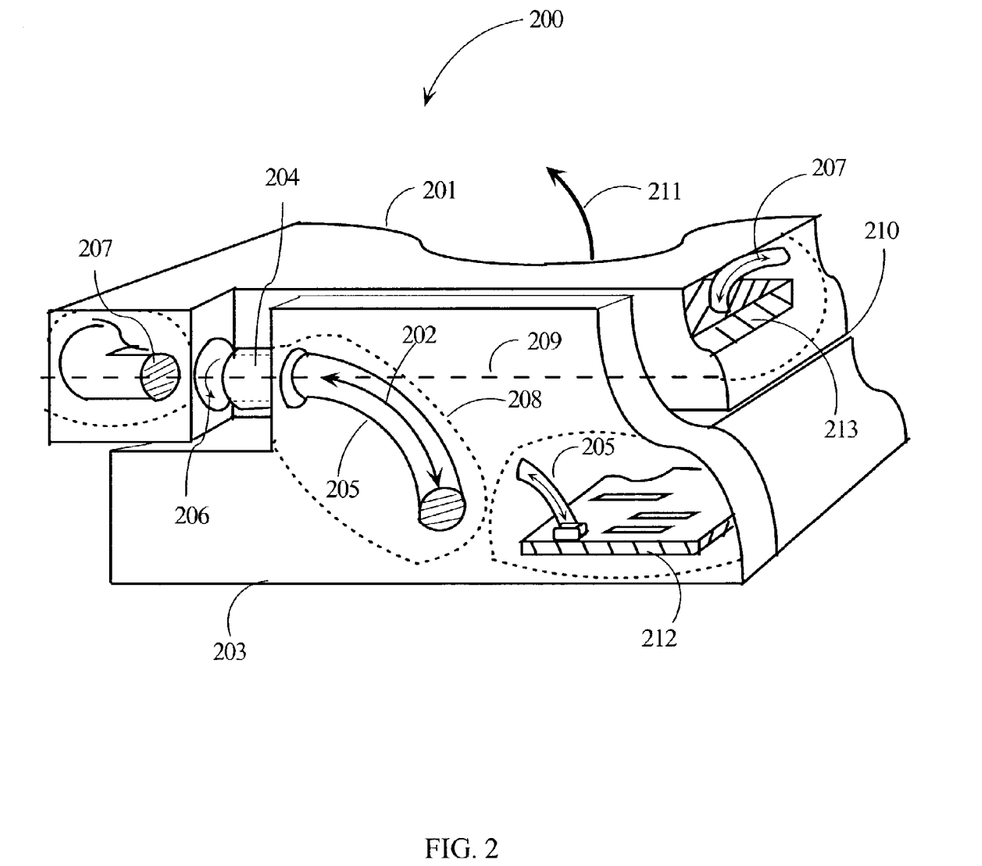
FIG. 2 is a view of portions of a computing device according to one embodiment of the present invention.

FIG. 2 illustrates using light and optical fiber to couple light to an air gap interface area. Cut-outs are shown dotted (e.g., 208) exposing elements which are normally hidden from view. FIG. 2 illustrates portions of an exemplary base 203 and lid 201 of a computing device 200. Lid 201 has a hole 206 into which a cylindrical element 204 fits. Hole 206 and element 204 operate as a hinge element. A corresponding hinge element (not shown) would be positioned on the other side of lid 201 to complete the hinge assembly. Lid 201 has as an optical fiber 207 disposed substantially coaxial with hole 206. Cylindrical element 204 also has a hole 208 so that light from optical fiber 205 may reach optical fiber 207 via an air gap (between optical fiber 205 and optical fiber 207). Lid 201 is shown closed over base 203 with separating gap 210. Lid 201 may be rotated (opened) about axis 209 on its hinge elements (e.g., element 204 and hole 206). Optical fiber 205 in base 203 does not move. While optical fiber 207 does move, its axis of communication remains fixed and directed toward optical fiber 205. Optical fiber 205 couples to a transceiver (not identified) in a sub-assembly (e.g., motherboard 212) in base 203. Likewise optical fiber 207 couples to a transceiver (not identified) in sub-assembly 213 in lid 201. FIG. 2 illustrates one example of how embodiments of the present invention may use an air gap interface to optically communicate without the communication elements physically touching.

In computing device 200, the means of carrying the data is accomplished by placing the waveguides (in this case optical fibers 205 and 207) in the axis of rotation of the hinge, thus avoiding an actual touching a wires, tubes, or other physical devices which could be damaged by twisting or binding. Data may be carried by two separate waveguides, or bi-directional data may be carried over the same waveguide (illustrated by arrow 202), depending on the signal frequencies and modulation methods.

Figure 4A:
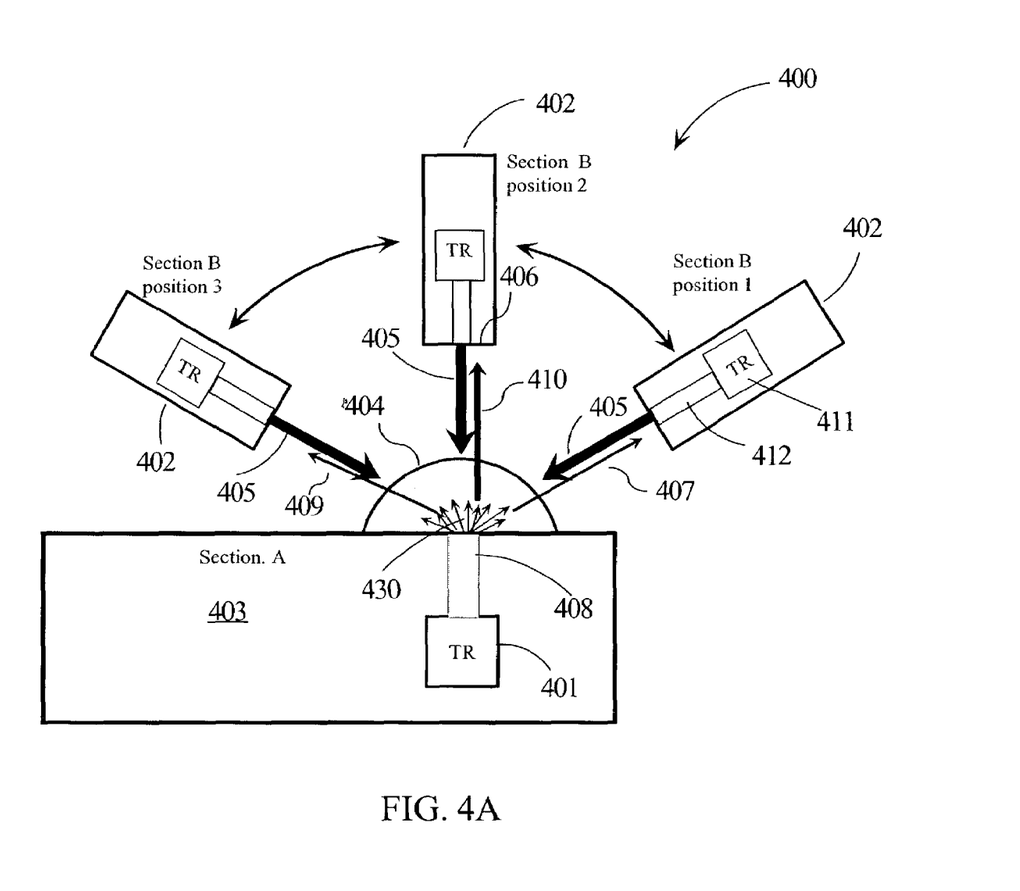
FIG. 4A and FIG. 4B are views of a computing device illustrating transmitting data across an air gap according to one embodiment of the present invention.
Figure 4B:
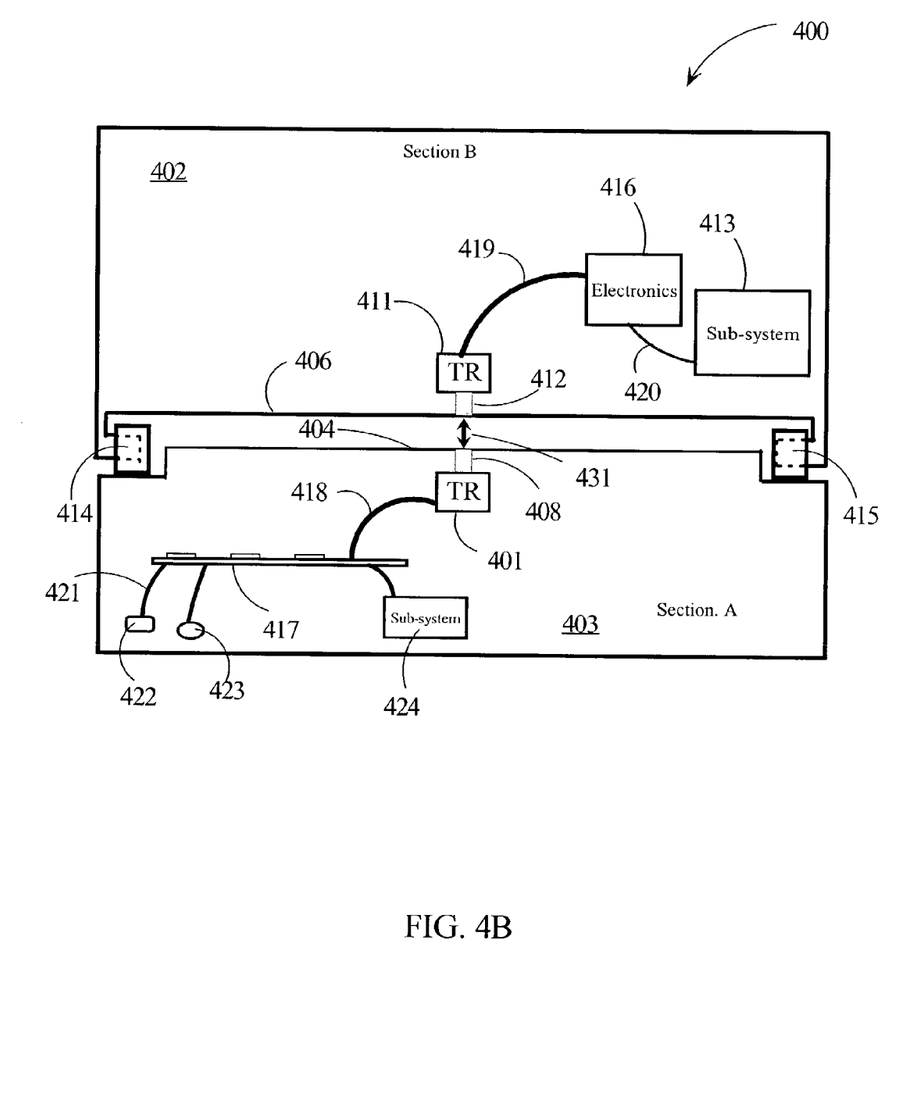

FIGS. 4A and 4B illustrate views of a computing device 400 according to an embodiment of the present invention. In this example, light is used in the exemplary computing device 400 to simplify explanation of the present invention. It is understood that other electromagnetic frequencies may be used and still be within the scope of the present invention.

In FIG. 4A, section A 403 and a section B 402 are coupled with a hinge means (not shown) such that section B 402 may be rotated relative to section A 403. As section B 402 is rotated from position 1 to position 3, surface 406 of section B 402 is separated by an air gap and remains substantially a fixed distance from surface 404 of section A 403. Optical fiber 412 couples transceiver (TR) 411 to surface 406 of section B 402. Likewise optical fiber 408 couples TR 401 to a desired position within base 403. Surface 404 is formed as a focusing lens for light signals 405 transmitted by TR 402. This allows light (optical signals 405) from optical fiber 412 to be focused to optical fiber 408 relatively independent of position of TR 411 as section B 402 is rotated. If TR 401 is transmitting, optical fiber 408 is constructed so that light 430 has a radial distribution. While the magnitude of light 430 as "seen" by TR 411 may vary with its radial position, proper modulation techniques would allow communication over the air gap separating section A 403 and section B 402. Vectors 407, 409 and 410 illustrate that the magnitude of the signal received by TR 411 may vary with position. The material in section A 403 in and around surface 404 is substantially transparent to the frequency of communication.

FIG. 4B is another view of computing device 400. Lid 402 is hinged to base 403 with hinge elements 414 and 415. Exemplary subsystem 413 is coupled to electronics 416 with communication link 420. Electronics 416 is coupled to TR 411 with communication link 419. TR 411 couples an optical signal to surface 406 with optical fiber 412. Optical data 431 is communicated perpendicular to the axis of rotation of lid 201 across the air gap separating surface 404 from surface 406. Optical fiber 408 couples the optical data 431 to TR 401. TR 401 is coupled to motherboard 417 which may contain MUXs, encoders and other signal processing circuitry. Exemplary subsystem 424 is coupled to motherboard 417. Likewise connectors 422 and 423 are coupled (e.g., via communication link 421) and may be used to couple subsystems (not shown) external to computing device 400 to elements in lid 402.

While computing device 400 is shown using light to communicate across an air gap separating surface 406 and surface 404, it is understood that other frequencies of communication may be used and still be within the scope of the present invention.

Figure 5:
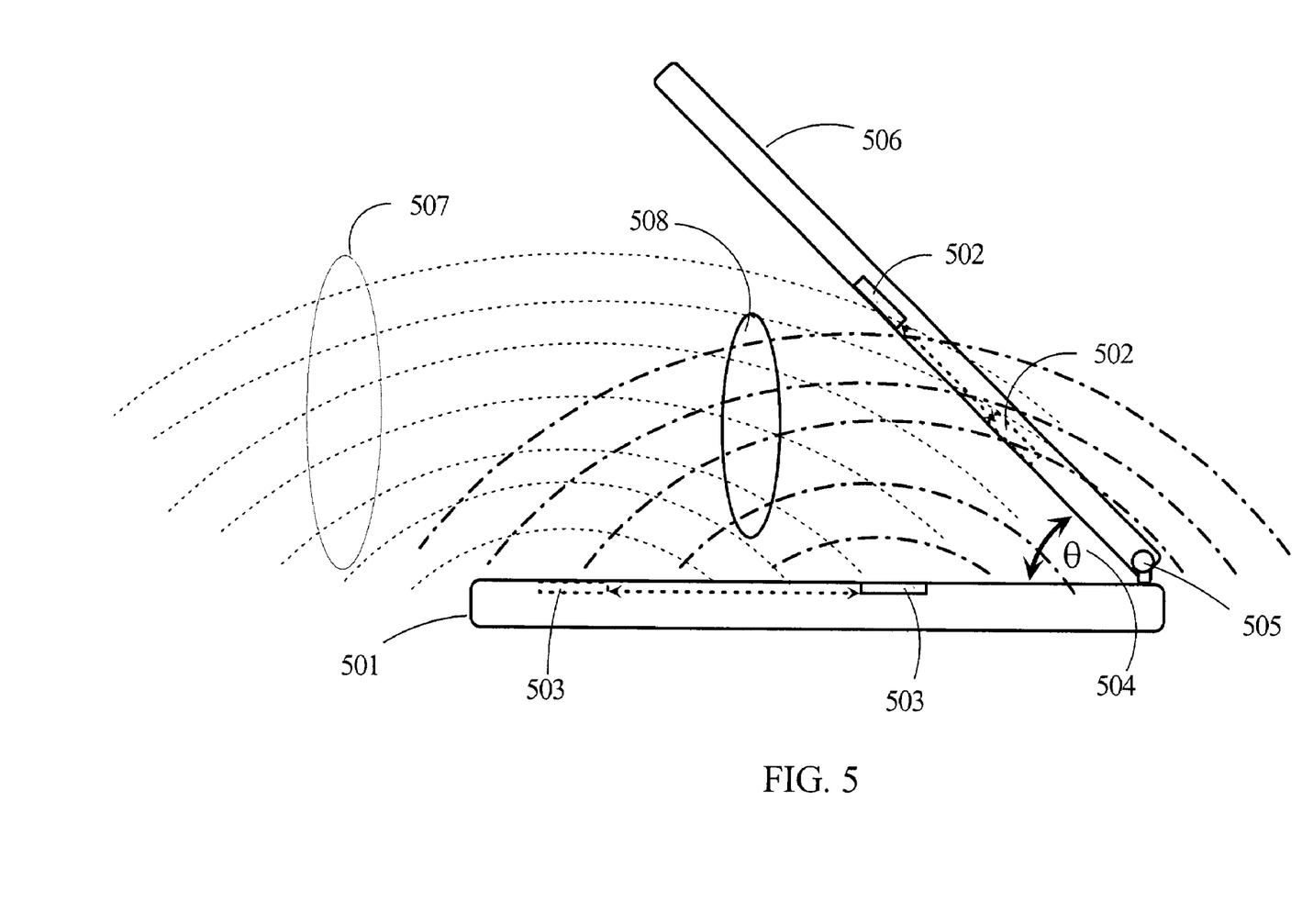
FIG. 5 illustrates a side view of a computing device where the surfaces of the two sections of the computing device containing wireless communication devices have angular relative positions.

FIG. 5 illustrates another embodiment of the present invention where communication between moveable elements uses what is commonly referred to as radio or microwave radiation. Lid 506 rotates about hinge 505 relative to base 501 to open notebook computer 500. A transceiver 503 may be variable positioned as shown and may have a radiation pattern illustrated by the lines 507 or 508. These radiation patterns would encompass a transceiver 502 in either illustrated position in lid 506.

The frequency of the electromagnetic radiation (e.g., 507 and 508) may have a wide range and still be usable to transmit and receive data needed between a transceiver in the lid 506 and base 501; either carried over a single frequency (direct frequency or amplitude modulation) or multiple frequencies (e.g., spread spectrum modulations with various encoding schemes such as orthogonal frequency division multiplexing). Wave patterns other than 507 and 508 shown in FIG. 5 may be used as long as transceivers in the lid 506 and base 501 are positioned to receive the transmitted data through the desired rotation angle 504.

In another embodiment, transceivers 502 and 503 utilize a large continuous band of radiation frequencies allowing a less intrusive and lower powered radio to be constructed. This technique is known as ultra wide band (UWB) radio and utilizes a very wide range of frequencies (at low-power) to carry fast pulses between the two sections of the computer.

The embodiments employing radio transceivers have flexibility in where the transceivers are placed within the respective subsystems; the nature of the radio radiation allows the transmitters and receivers to be placed within the hinging/moving sections in whatever way is most convenient to the designer of the portable computer system.

Figure 3:
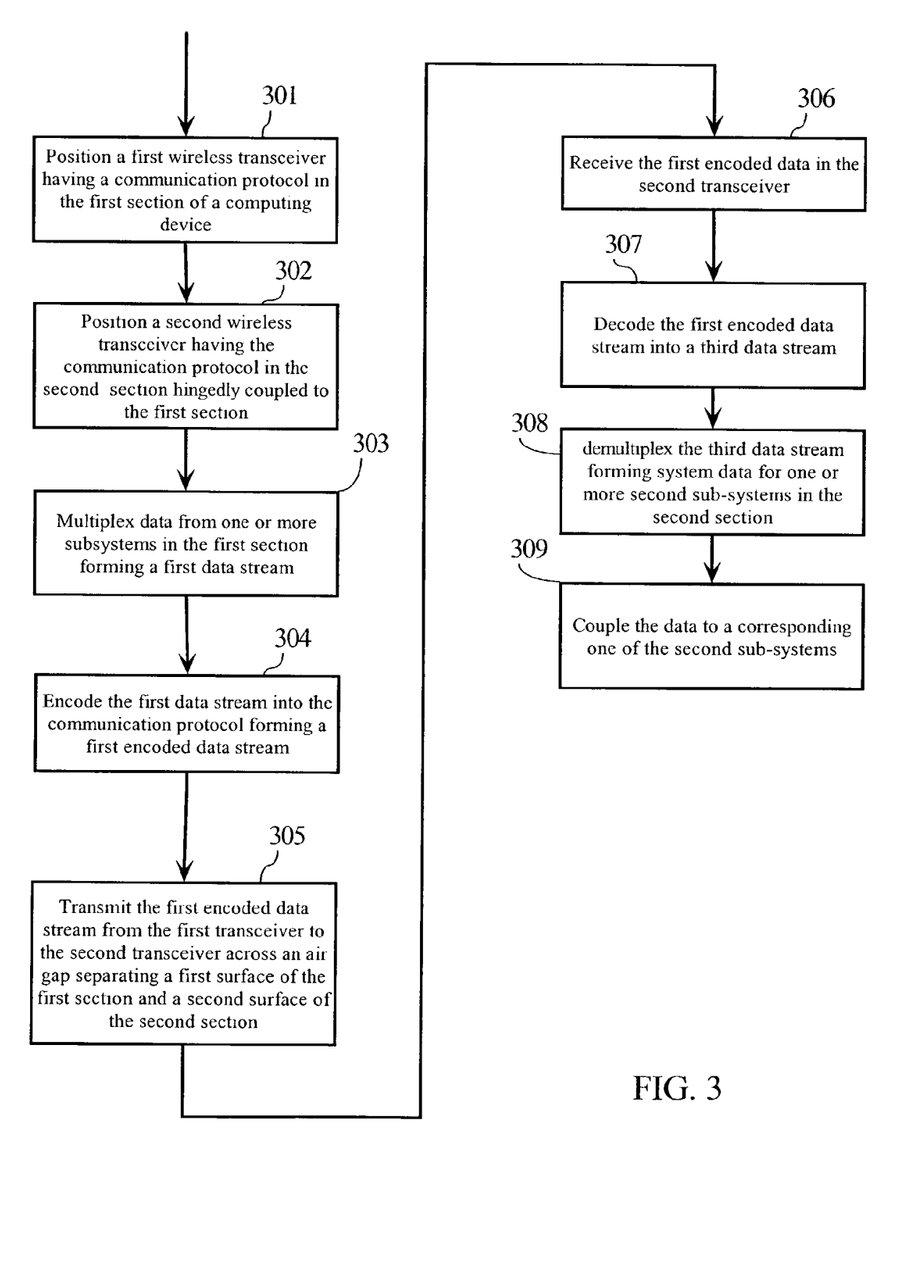
FIG. 3 is a flow diagram of method steps used in embodiments of the present invention.

FIG. 3 is a flow diagram of method steps used in embodiments of the present invention. In step 301, a first wireless transceiver having a communication protocol (e.g., transceiver 106) is positioned in the first section (e.g., the base 109) of a computing device. In step 302, a second wireless transceiver (e.g., transceiver 104) having the communication protocol is positioned in the second section (e.g., the lid 101) which is hingedly coupled to the base 109. In step 303, data from one or more subsystems in the base 109 is multiplexed in 108 forming a first data stream (e.g., 124). In step 304, the first data stream 124 is encoded (e.g., by encoder/decoder 107) into the communication protocol forming a first encoded data stream (e.g., 126). The first encoded data stream 126 is transmitted from transceiver 106 to transceiver 104 across air gap interface 105 separating surfaces of the lid 101 and the base 109. In step 306, the first encoded data stream 126 is received in transceiver 104. The first encoded data stream 126 is decoded (e.g., by encoder/decoder 103) into a third data stream (e.g., decoded data 122). In step 308, decoded data 122 is demultiplexed in 102 forming system data for one or more subsystems (e.g., WLAN 116 devices, USB 117 devices or LCD 118). In step 309, the system data is coupled to the corresponding subsystems.

Although the present invention and its advantages have been described in detail, it should be understood that various changes, substitutions and alterations can be made herein without departing from the spirit and scope of the invention as defined by the appended claims.

What is claimed is:

1. A method of communicating comprising the steps of:
hingedly coupling first and second sections of a computing device;
positioning a first wireless transceiver having a communication protocol in said first section;
positioning a second transceiver having said communication protocol in said second section;
multiplexing data from one or more first subsystems in said first section forming a first data stream;
encoding said first data stream into said communication protocol forming a first encoded data stream; and
transmitting said first encoded data stream from said first transceiver to said second transceiver across an air gap separating a first surface of said first section and a second surface of said second section.

2. The method of claim 1, wherein said first and second surfaces are substantially orthogonal to an axis of rotation corresponding to a hinging means coupling said first and second section.

3. The method of claim 1, wherein said first and second surfaces are substantially parallel to an axis of rotation of corresponding to a hinging means coupling said first and second section.

4. The method of claim 1, wherein said first and second surfaces have an angular relative position and are orthogonal to an axis of rotation of corresponding to a hinging means coupling said first and second sections.

5. The method of claim 1, wherein said one or more first subsystems comprise a wireless local area network device, a universal serial port device and a liquid crystal display device.

6. The method of claim 1, wherein said one or more second subsystems comprise a wireless local area network device, a universal serial port device and a storage device coupled to a system motherboard.

7. A method of communicating comprising the steps of:
hingedly coupling first and second sections of a computing device;
positioning a first wireless transceiver having a communication protocol in said first section;
positioning a second transceiver having said communication protocol in said second section;
multiplexing data from one or more first subsystems in said first section forming a first data stream;
encoding said first data stream into said communication protocol forming a first encoded data stream;

transmitting said first encoded data stream from said first transceiver to said second transceiver across an air gap separating a first surface of said first section and a second surface of said second section;
decoding said first encoded data stream received by said second transceiver forming a third data stream;
demultiplexing said third data stream forming system data for said one or more second subsystems; and
coupling said system data to a corresponding one of said second subsystems.

8. A method of communicating comprising the steps of:
hingedly coupling first and second sections of a computing device;
positioning a first wireless transceiver having a communication protocol in said first section;
positioning a second transceiver having said communication protocol in said second section;
multiplexing data from one or more first subsystems in said first section forming a first data stream;
encoding said first data stream into said communication protocol forming a first encoded data stream;
transmitting said first encoded data stream from said first transceiver to said second transceiver across an air gap separating a first surface of said first section and a second surface of said second section;
multiplexing data from one or more second subsystems in said second section forming a second data stream;
encoding said second data stream into said communication protocol forming a second encoded data stream; and
transmitting said second encoded data stream from said second transceiver to said first transceiver across said air gap separating said first surface of said first section and said second surface of said second section.

9. The method of claim 8 further comprising the steps of:
decoding said second encoded data stream received by said second transceiver forming a fourth data stream;
demultiplexing said fourth data stream forming system data for said one or more first subsystems; and
coupling said system data to a corresponding one of said first subsystems.

10. A method of communicating comprising the steps of:
hingedly coupling first and second sections of a computing device;
positioning a first wireless transceiver having a communication protocol in said first section;
positioning a second transceiver having said communication protocol in said second section;
multiplexing data from one or more first subsystems in said first section forming a first data stream;
encoding said first data stream into said communication protocol forming a first encoded data stream; and
transmitting said first encoded data stream from said first transceiver to said second transceiver across an air gap separating a first surface of said first section and a second surface of said second section;
wherein said first and second surfaces are substantially orthogonal to an axis of rotation corresponding to a hinging means coupling said first and second section;
wherein said first surface comprises a first optical fiber coupled to said first transceiver and said second surface comprises a second optical fiber coupled to said second transceiver.

11. A method of communicating comprising the steps of:
hingedly coupling first and second sections of a computing device;
positioning a first wireless transceiver having a communication protocol in said first section;
positioning a second transceiver having said communication protocol in said second section;
multiplexing data from one or more first subsystems in said first section forming a first data stream;
encoding said first data stream into said communication protocol forming a first encoded data stream; and
transmitting said first encoded data stream from said first transceiver to said second transceiver across an air gap separating a first surface of said first section and a second surface of said second section;
wherein said first and second surfaces are substantially parallel to an axis of rotation of corresponding to a hinging means coupling said first and second section;
wherein said first surface comprises a first optical fiber coupled to said first transceiver and said second surface comprises a second optical fiber coupled to said second transceiver.

12. A method of communicating comprising the steps of:
hingedly coupling first and second sections of a computing device;
positioning a first wireless transceiver having a communication protocol in said first section;
positioning a second transceiver having said communication protocol in said second section;
multiplexing data from one or more first subsystems in said first section forming a first data stream;
encoding said first data stream into said communication protocol forming a first encoded data stream; and
transmitting said first encoded data stream from said first transceiver to said second transceiver across an air gap separating a first surface of said first section and a second surface of said second section;
wherein said first and second surfaces have an angular relative position and are orthogonal to an axis of rotation of corresponding to a hinging means coupling said first and second sections;
wherein said first surface comprises a first electromagnetic transducer coupled to said first transceiver and said second surface comprises a second electromagnetic transducer coupled to said second transceiver.

13. A computing device comprising:
a first section having one or more first subsystems;
a second section hingedly coupled to said first section and having one or more second subsystems;
a first wireless transceiver integral to said first section and having a communication protocol;
a second transceiver integral to said second section and having said communication protocol;
a first multiplexing circuit for multiplexing data from said one or more first subsystems forming a first data stream;
a first encoding circuit for encoding said first data stream into said communication protocol forming a first encoded data stream;
a first demultiplexing circuit for demultiplexing data from said one or more second subsystems forming a third data stream;
a means for coupling said third data stream to said one or more first subsystems; and
an air gap separating a first surface of said first section and a second surface of said second section, said first surface having a first communication path coupled to said first transceiver and said second surface having a second communication path coupled to said second transceiver, wherein said first transceiver transmits said first encoded data stream to said second transceiver.

14. The computing device of claim 13, wherein said first and second surfaces are substantially orthogonal to an axis of rotation corresponding to a hinging means coupling said first and second section.

15. The computing device of claim 13, wherein said first and second surfaces are substantially parallel to an axis of rotation corresponding to a hinging means coupling said first and second section.

16. The computing device of claim 13, wherein said first and second surfaces have an angular relative position and are orthogonal to an axis of rotation of corresponding to a hinging means coupling said first and second sections.

17. The computing device of claim 13, wherein said one or more first subsystems comprise a wireless local area network device, a universal serial port device, and a liquid crystal display device.

18. The computing device of claim 13, wherein said one or more second subsystems comprise a wireless local area network device, a universal serial port device and a storage device coupled to a system motherboard.

19. A computing device comprising:
a first section having one or more first subsystems;
a second section hingedly coupled to said first section and having one or more second subsystems;
a first wireless transceiver integral to said first section and having a communication protocol;
a second transceiver integral to said second section and having said communication protocol;
a first multiplexing circuit for multiplexing data from said one or more first subsystems forming a first data stream;
a first encoding circuit for encoding said first data stream into said communication protocol forming a first encoded data stream;
a first demultiplexing circuit for demultiplexing data from said one or more second subsystems forming a third data stream;
a means for coupling said third data stream to said one or more first subsystems;
an air gap separating a first surface of said first section and a second surface of said second section, said first surface having a first communication path coupled to said first transceiver and said second surface having a second communication path coupled to said second transceiver, wherein said first transceiver transmits said first encoded data stream to said second transceiver;
a second multiplexing circuit for multiplexing data from said one or more second subsystems forming a second data stream;
a second demultiplexing circuit for demultiplexing data from said one or more first subsystems forming a fourth data stream;
a means for coupling said fourth data stream to said one or more second subsystems; and
a second encoding circuit for encoding said second data stream into said communication protocol forming a second encoded data stream, wherein said second transceiver transmits said second encoded data stream to said first transceiver.

20. A computing device comprising:
a first section having one or more first subsystems:
a second section hingedly coupled to said first section and having one or more second subsystems;
a first wireless transceiver integral to said first section and having a communication protocol;
a second transceiver integral to said second section and having said communication protocol;
a first multiplexing circuit for multiplexing data from said one or more first subsystems forming a first data stream;
a first encoding circuit for encoding said first data stream into said communication protocol forming a first encoded data stream;
a first demultiplexing circuit for demultiplexing data from said one or more second subsystems forming a third data stream;
a means for coupling said third data stream to said one or more first subsystems; and
an air gap separating a first surface of said first section and a second surface of said second section, said first surface having a first communication path coupled to said first transceiver and said second surface having a second communication path coupled to said second transceiver, wherein said first transceiver transmits said first encoded data stream to said second transceiver;
wherein said first and second surfaces are substantially orthogonal to an axis of rotation corresponding to a hinging means coupling said first and second section;
wherein said first surface comprises a first optical fiber coupled to said first transceiver and said second surface comprises a second optical fiber coupled to said second transceiver.

21. A computing device comprising:
a first section having one or more first subsystems;
a second section hingedly coupled to said first section and having one or more second subsystems;
a first wireless transceiver integral to said first section and having a communication protocol;
a second transceiver integral to said second section and having said communication protocol;
a first multiplexing circuit for multiplexing data from said one or more first subsystems forming a first data stream;
a first encoding circuit for encoding said first data stream into said communication protocol forming a first encoded data stream;
a first demultiplexing circuit for demultiplexing data from said one or more second subsystems forming a third data stream;
a means for coupling said third data stream to said one or more first subsystems; and
an air gap separating a first surface of said first section and a second surface of said second section, said first surface having a first communication path coupled to said first transceiver and said second surface having a second communication path coupled to said second transceiver, wherein said first transceiver transmits said first encoded data stream to said second transceiver;
wherein said first and second surfaces are substantially parallel to an axis of rotation corresponding to a hinging means coupling said first and second section;
wherein said first surface comprises a first optical fiber coupled to said first transceiver and said second surface comprises a second optical fiber coupled to said second transceiver.

22. A computing device comprising:
a first section having one or more first subsystems;
a second section hingedly coupled to said first section and having one or more second subsystems;
a first wireless transceiver integral to said first section and having a communication protocol;
a second transceiver integral to said second section and having said communication protocol;
a first multiplexing circuit for multiplexing data from said one or more first subsystems forming a first data stream;

a first encoding circuit for encoding said first data stream into said communication protocol forming a first encoded data stream;

a first demultiplexing circuit for demultiplexing data from said one or more second subsystems forming a third data stream;

a means for coupling said third data stream to said one or more first subsystems; and an air gap separating a first surface of said first section and a second surface of said second section, said first surface having a first communication path coupled to said first transceiver and said second surface having a second communication path coupled to said second transceiver, wherein said first transceiver transmits said first encoded data stream to said second transceiver;

wherein said first and second surfaces have an angular relative position and are orthogonal to an axis of rotation of corresponding to a hinging means coupling said first and second sections;

wherein said first surface comprises a first electromagnetic transducer coupled to said first transceiver and said second surface comprises a second electromagnetic transducer coupled to said second transceiver.

* * * * *